United States Patent
Kim et al.

(10) Patent No.: US 10,039,062 B2
(45) Date of Patent: Jul. 31, 2018

(54) UPLINK TRANSMIT POWER OF A MOBILE CONTROLLED BY BASE STATION BASED ON DIFFERENCE BETWEEN TARGET AND RECEIVED QUALITY

(71) Applicant: ELECTRONICS AND TELECOMMUNICATIONS RESEARCH INSTITUTE, Daejeon (KR)

(72) Inventors: Dae Ik Kim, Daejeon (KR); JeeHyeon Na, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/451,779

(22) Filed: Mar. 7, 2017

(65) Prior Publication Data

US 2017/0289921 A1 Oct. 5, 2017

(30) Foreign Application Priority Data

Apr. 1, 2016 (KR) .................. 10-2016-0040306
Sep. 21, 2016 (KR) .................. 10-2016-0120963

(51) Int. Cl.
*H04W 52/14* (2009.01)
*H04W 52/24* (2009.01)
(Continued)

(52) U.S. Cl.
CPC ........ *H04W 52/242* (2013.01); *H04B 17/336* (2015.01); *H04W 52/365* (2013.01); *H04W 72/0473* (2013.01); *H04W 72/087* (2013.01)

(58) Field of Classification Search
CPC ............ H04W 52/242; H04W 52/365; H04W 17/336; H04W 72/0473; H04W 72/087;
(Continued)

(56) References Cited

U.S. PATENT DOCUMENTS 8,504,092 B2 8/2013 Kim et al.
9,131,453 B2 9/2015 Gaal et al.
(Continued)

FOREIGN PATENT DOCUMENTS

KR 10-0753283 B1 8/2007
KR 10-0965300 B1 6/2010

OTHER PUBLICATIONS

Dae-Ik Kim et al, "Study on Uplink Closed-Loop Power Control in LTE Small Cell", 2015.

*Primary Examiner* — Philip Sobutka
(74) *Attorney, Agent, or Firm* — LRK Patent Law Firm

(57) ABSTRACT

A method for controlling, by a base station, uplink transmission power of a mobile terminal. The base station receives an available transmission power amount of the mobile terminal from the mobile terminal. The base station determines a target channel quality value corresponding to a current location of the mobile terminal, on the basis of the available transmission power amount.
The base station determines a received channel quality value using an uplink data channel received from the mobile terminal. Further, the base station determines a transmit power control (TPC) using a difference between the target channel quality value and the received channel quality value.

17 Claims, 7 Drawing Sheets

(51) Int. Cl.
*H04W 52/36* (2009.01)
*H04B 17/336* (2015.01)
*H04W 72/04* (2009.01)
*H04W 72/08* (2009.01)

(58) Field of Classification Search
CPC ............. H04W 52/146; H04W 52/241; H04W 52/367; H04W 72/0413; H04W 52/34; H04W 52/08; H04W 52/248; H04W 52/24; H04W 52/12; H04W 52/18
USPC ........................................................ 455/522
See application file for complete search history.

(56) References Cited

U.S. PATENT DOCUMENTS

| 9,277,505 B2 | 3/2016 | Kim et al. |
| 2015/0009913 A1 | 1/2015 | Lee et al. |
| 2017/0118727 A1* | 4/2017 | Panchal .............. H04W 52/365 |

* cited by examiner

UPLINK TRANSMIT POWER OF A MOBILE CONTROLLED BY BASE STATION BASED ON DIFFERENCE BETWEEN TARGET AND RECEIVED QUALITY

CROSS-REFERENCE TO RELATED APPLICATION(S)

This application claims priority to and the benefit of Korean Patent Application Nos. 10-2016-0040306 and 10-2016-0120963, filed in the Korean Intellectual Property Office on Apr. 1, 2016 and Sep. 21, 2016, the entire contents of which are incorporated herein by reference.

BACKGROUND OF THE INVENTION

1. Field of the Invention

The present invention relates to a method and an apparatus for controlling uplink transmission power of a mobile terminal in a long term evolution (LTE)-based small cell base station system.

2. Description of Related Art

An uplink power control in a wireless communication system is a technology of optimally controlling transmission power of a mobile terminal. The uplink power control is to keep a predetermined level of received channel quality (for example, received signal-to-interference plus noise ratio (SINR), received signal to noise ratio (SNR), or the like) that a base station requires, minimize interference with neighbor base stations, and maximize battery life of the mobile terminal. The uplink power control is a main element for radio resource management (RRM).

The power control needs to be optimized in consideration of a radio channel state including a path loss, shadowing, or the like while minimizing interference with neighbor cells.

For this purpose, an open-loop power control and a closed-loop power control for a physical uplink shared channel (PUSCH) and a physical uplink control channel (PUCCH) are defined in the LTE.

Meanwhile, if the transmission power exceeds maximum power that the mobile terminal may transmit, PUSCH receive performance of the base station is degraded, uplink performance is degraded, and battery consumption of the mobile terminal becomes severe. Therefore, a method for reducing battery to consumption of a mobile terminal by preventing transmission power from exceeding maximum power that the mobile terminal may transmit is required.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method and an apparatus for controlling power having advantages of minimizing battery consumption of a mobile terminal while keeping received power that a base station requires.

Further, the present invention has been made in an effort to provide a method and an apparatus for controlling uplink transmission power in an LTE-based small cell base station system.

An exemplary embodiment of the present invention provides a method for controlling, by a base station, uplink transmission power of a mobile terminal. The method includes receiving an available transmission power amount of the mobile terminal from the mobile terminal; determining a target channel quality value corresponding to a current location of the mobile terminal, on the basis of the available transmission power amount; determining a received channel quality value using an uplink data channel received from the mobile terminal; and determining a transmit power control (TPC) using a difference between the target channel quality value and the received channel quality value.

The receiving of the available transmission power amount may include receiving a power headroom report (PHR) indicating the available transmission power amount.

The determining of the target channel quality value on the basis of the available transmission power amount may include deriving a path loss using the PHR when a first value indicating how much the path loss corresponding to the current location of the mobile terminal is compensated is smaller than 1 and determining the target channel quality value depending on the derived path loss.

The determining of the received channel quality value may include smoothing a first channel quality value measured for the uplink data channel.

The smoothing may include smoothing the first channel quality value on the basis of an exponential filter that is a moving average filter.

The smoothing of the first channel quality value on the basis of the exponential filter may include using a second channel quality value for an M3 message first received for a random access as an initial value for the exponential filter.

The determining of the TPC may include calculating, at a first time, a first difference between the target channel quality value and the received channel quality value determined during an update period for updating the TPC and determining a TPC command on the basis of the first difference.

The update period may be changed depending on radio channel environment.

The determining of the TPC command on the basis of the first difference may include setting a difference between the target channel quality value and to the received channel quality value to be 0 from the first time to time when a next update period ends.

The method may further include: determining the maximum number of resource blocks allocated to the mobile terminal on the basis of the available transmission power amount and the current location of the mobile terminal; and allocating the number of resource blocks smaller than the maximum number to the mobile terminal.

The base station may be a small cell base station.

The target channel quality value and the received channel quality value may be one of a signal-to-interference plus noise ratio (SINR) and a signal to noise ratio (SNR).

The uplink data channel may be a physical uplink shared channel (PUSCH).

Another exemplary embodiment of the present invention provides a method for controlling, by a mobile terminal, uplink transmission power. The method includes: transmitting an available transmission power amount of the mobile terminal to a base station; transmitting an uplink data channel to the base station; and receiving, from the base station, a transmit power control (TPC) determined by a difference between a target channel quality value on the basis of a first value indicating how much a path loss of the mobile terminal is compensated and the available transmission power amount and a received channel quality value for the uplink data channel.

The method may further include: receiving an allocation of the number of resource blocks smaller than the maximum number of resource blocks allocated to to the mobile terminal from the base station.

The maximum number may be determined on the basis of the available transmission power amount and the path loss of the mobile terminal.

Yet another exemplary embodiment of the present invention provides a base station. The base station includes: a memory; and a processor connected to the memory and determining a target channel quality value corresponding to a path loss of a mobile terminal on the basis of a power headroom report (PHR) of the mobile terminal.

The processor may determine a transmit power control (TPC) command for the mobile terminal on the basis of a difference between a received channel quality value determined by a physical uplink shared channel (PUSCH) of the mobile terminal and the target channel quality value.

The processor may determine the maximum number of resource blocks allocated to the mobile terminal on the basis of the PHR and the path loss of the mobile terminal and allocate the number of resource blocks smaller than the maximum number to the mobile terminal.

DETAILED DESCRIPTION OF THE EMBODIMENTS

Figure 1:
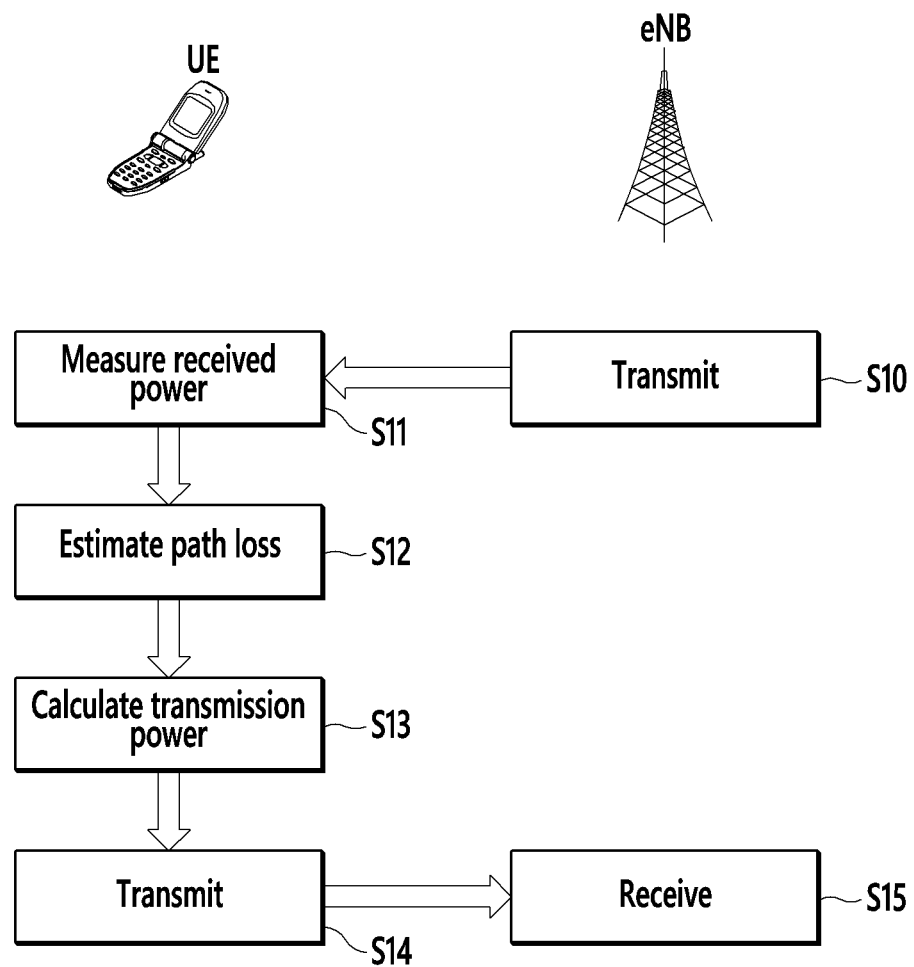
FIG. 1 is a diagram illustrating a concept of an open-loop power control.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, the overlapping description of the same components will be omitted.

Further, in the present specification, it is to be understood that when one component is referred to as being "connected to" or "coupled to" another element, it may be connected directly to or coupled directly to another element or be connected to or coupled to another element, having the other element intervening therebetween. On the other hand, in the present specification, it is to be understood that when one element is referred to as being "connected to directly to" or "coupled directly to" another element, it may be connected to or coupled to another element without the other element intervening therebetween.

Further, terms used in the present specification are used only in order to describe specific exemplary embodiments rather than limiting the present invention.

Further, in the present specification, singular forms may be intended to include plural forms unless the context clearly indicates otherwise.

Further, in the present specification, it will be further understood that the terms "include" or "have" used in the present specification, specify the presence of features, numerals, steps, operations, components, parts mentioned in the present specification, or a combination thereof, but do not preclude the presence or addition of one or more other features, numerals, steps, operations, components, parts, or a combination thereof.

Further, in the present specification, the term "and/or" includes a combination of a plurality of relevant items or any of a plurality of relevant items. In the present specification, 'A or B' may include 'A', 'B', or 'A and B'.

Further, in the present specification, a mobile terminal may refer to a terminal, a mobile station, an advanced mobile station, a high reliability mobile station, a subscriber station, a portable subscriber station, an access terminal, user equipment, and the like and may also include all or some of the functions of the mobile terminal, the terminal, the mobile station, the advanced mobile station, the high reliability mobile station, the subscriber station, the portable subscriber station, the access terminal, the user equipment, and the like.

Further, in the present specification, a base station (BS) may refer to an to advanced base station, a high reliability base station, a nodeB, an evolved node B (eNodeB, eNB), an access point, a radio access station, a base transceiver station, a mobile multihop relay (MMR)-BS, a relay station serving as a base station, a high reliability relay station serving as a base station, a repeater, a macro cell base station, a small cell base station, and the like and may also include all or some of the functions of the base station, the advanced base station, the HR-BS, the nodeB, the eNodeB, the access point, the radio access station, the base transceiver station, the MMR-BS, the relay station, the high reliability relay station, the repeater, the macro cell base station, the small cell base station, and the like.

FIG. 1 is a diagram illustrating a concept of an open-loop power control.

In a method for controlling open-loop power, a base station transmits a reference signal to a mobile terminal (S10).

The mobile terminal measures received power of the reference signal transmitted by the base station (S11).

The mobile terminal calculates (estimates) a path loss after the measurement (S12).

The mobile terminal determines (calculates) transmission power on the basis of an open-loop power control value configured in the corresponding mobile terminal (S13).

The mobile terminal transmits a message to the base station on the basis of the determined transmission power (S14 and S15). At this point, the base station never performs feedback, and therefore the power control is referred to to the open-loop power control.

Figure 2:
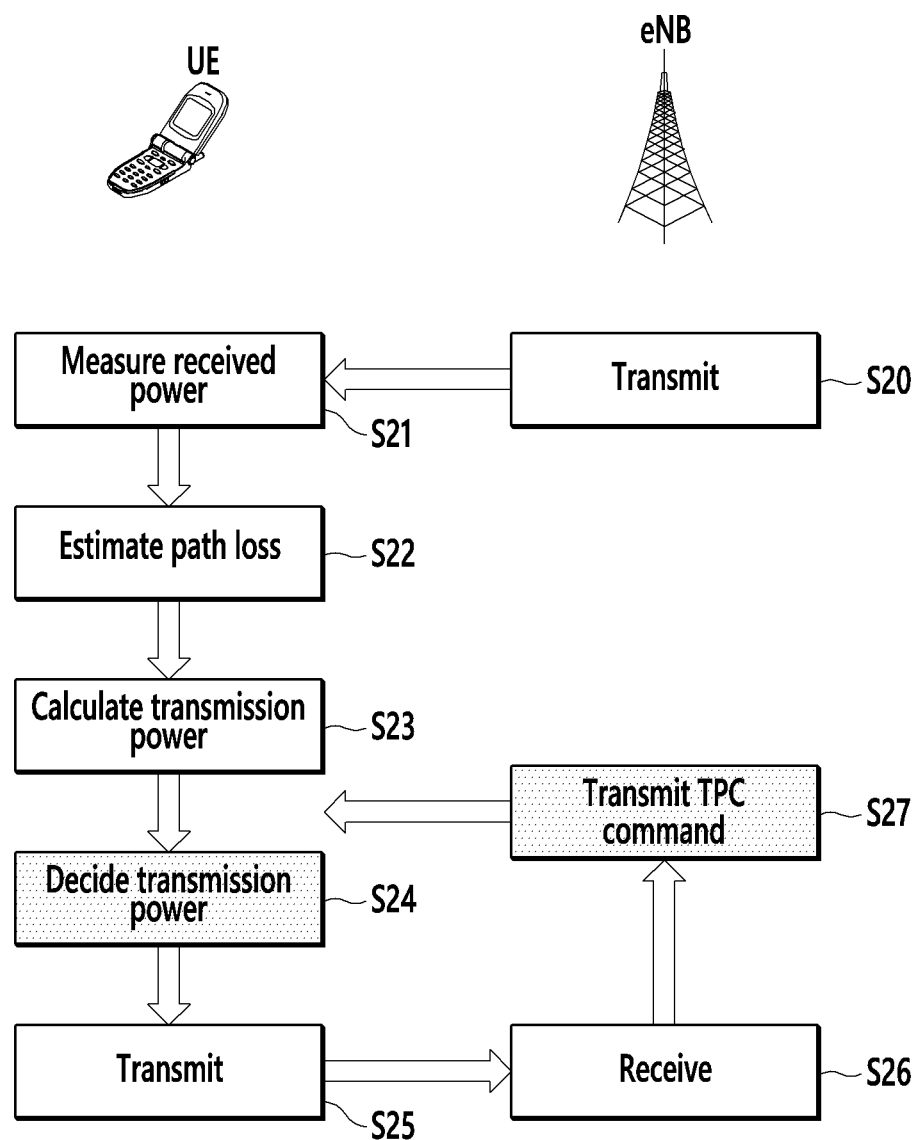
FIG. 2 is a diagram illustrating a concept of a closed-loop power control.

FIG. 2 is a diagram illustrating a concept of a closed-loop power control.

In the method for controlling open-loop power, the base station transmits the reference signal to the mobile terminal (S10).

The mobile terminal measures the received power of the reference signal transmitted by the base station (S21).

The mobile terminal calculates (estimates) the path loss (S22). The mobile terminal determines (calculates) transmission power on the basis of a closed-loop power control value configured in the corresponding mobile terminal (S23).

The mobile terminal transmits the message to the base station on the basis of the determined transmission power (S25 and S26).

Meanwhile, unlike the method for controlling open-loop power, the method for controlling closed-loop power commands the mobile terminal to adjust transmission power when the base station receives the message from the mobile terminal. In detail, the base station may transmit a transmit power control (TPC) command to the mobile terminal to correct a difference between the received power and target power required by the base station (S27).

When receiving the TPC command, the mobile terminal corrects the transmission power as much as power offset indicated by the TPC command to determine the transmission power (S24).

The mobile terminal transmits the message to the base station on the basis of the transmission power determined in the S24 (S25 and S26).

As a result, the base station may keep the receive target power required by the base station.

In the method for controlling closed-loop power, the base station may not appreciate the transmission power and the path loss of the mobile terminal that is required to determine the TPC command. Therefore, a method for efficiently determining a TPC command is required.

Meanwhile, PUSCH transmission power of the mobile terminal is determined by the following Equation 1.

$$P_{PUSCH} = \min\left\{ \begin{matrix} P_{CMAX} \\ 10\log_{10}(M_{PUSCH}) + P_{0\_PUSCH} + \alpha \cdot PL + \Delta_{TF} + f(\Delta_{TPC}) \end{matrix} \right\} [dBm]$$

Equation 1

In the above Equation 1, $P_{CMAX}$ represents maximum power that the mobile terminal may transmit and has a value of 23±2 [dBm] and is set by the base station. Generally, $P_{CMAX}$ is set to be 23 [dBm].

In the above Equation 1, $M_{PUSCH}$ represents the number of physical resource blocks (PRB) transmitted through PUSCH.

In the above Equation 1, $P_{0\_PUSCH}$ is a parameter representing a received power spectral density (PSD) required by the base station. $P_{O\_PUSCH}$ consists of and $P_{0\_nominal}$ and $P_{0\_UE}$. That is, $P_{0\_PUSCH} = P_{0\_nominal} + P_{0\_UE}$.

$P_{0\_nominal}$ has a cell-specific value and are identically applied to all the mobile terminals within a cell.

$P_{0\_UE}$ is to compensate for an error generated by transmission power set per the mobile terminal and a path loss estimation error.

$P_{0\_nominal}$ has a value of [−126, 24] dBm.

$P_{0\_UE}$ has a value of [−8, 7] dB.

Further, $P_{0\_PUSCH}$ is calculated like the following Equation 2.

$$P_{0\_PUSCH} = \alpha \cdot (SINR_0 + P_n) + (1-\alpha)(P_{CMAX} - 10 \cdot \log_{10} M_0)$$
[dBm]

Equation 2

In the above Equation 2, α represents a compensation factor indicating how much the path loss is compensated to transmit a signal, SINR0 represents a target received SINR required by the base station when α=1, $P_n$ represents noise power per PRB, $P_{CMAX}$ represents maximum transmission power of the mobile terminal, and $M_0$ represents the number of reference transmit PRBs and may be generally set to be 1.

In α·PL of the above Equation 1, the PL represents the path loss estimated by the mobile terminal. α represents whether to transmit a signal by compensating for all the path losses >or whether to transmit a signal by compensating for only a part of the path losses. In detail, α may have one of {0, 0.4, 0.5, 0.6, 0.7, 0.8, 0.9, 1} values and may be set by the base station.

In the above Equation 1, $\Delta_{TF}$ is a parameter corresponding to fast fading. In detail, when a wireless device (for example, mobile terminal) transmits a signal in a state in which $\Delta_{TF}$ is set, the transmission power may be additionally compensated depending on an allocated modulation and coding scheme (MCS). As a result, the transmit PSD may be changed whenever the MCS is changed. $\Delta_{TF}$ is set to be {disable, enable} and the wireless device (for example, mobile terminal) may perform an on/off of the transmission power compensation depending on the setting of $\Delta_{TF}$.

In the above Equation 1, $f(\Delta_{TPC})$ is used to keep the receive PSD constant. In detail, when the wireless device (for example, base station) allocates resources to the mobile terminal to transmit downlink control information (DCI) or transmit the DCI for the purpose of the power control, the wireless device (for example, base station) may generate the TPC command on the basis of a difference between the received power of the received PUSCH and the receive target power required by the base station. Further, the wireless device (for example, base station) transmits the generated TPC command by including it in the corresponding DCI, thereby correcting the transmission power of the wireless device (for example, mobile terminal).

The TPC command may be determined by an accumulated method or an absolute method. In detail, the TPC command depends on the following Table 1 (mapping of TPC command field in DCI format 0/3/4) and Table 2 (mapping of TPC command field in DCI format 3A). The accumulated method or the absolute method is configured by the wireless device (for example, base station). The accumulated method is a method for continuously accumulating a power value to be compensated whenever the wireless device (for example, mobile terminal) receives the TPC command. Unlike the accumulated method, the absolute method is a method for applying, by a wireless device (for example, mobile terminal), a compensation value to transmission power only once.

TABLE 1

| TPC command field in DCI format 0/3/4 | Accumulated δ_PUSCH, c [dB] | Absolute δ_PUSCH, c [dB] only DCI format 0/4 |
|---|---|---|
| 0 | −1 | −4 |
| 1 | 0 | −1 |
| 2 | 1 | 1 |
| 3 | 3 | 4 |

TABLE 2

| TPC command field in DCI format 3A | Accumulated δ_PUSCH, c [dB] |
| --- | --- |
| 0 | −1 |
| 1 | 1 |

In the above Tables 1 and 2, δ_PUSCH, c represents $\delta_{PUSCH,c}$.

In the above Table 1 and Table 2, $\delta_{PUSCH,c}$ represents the transmission power to be actually compensated depending on a TPC command indication factor. For example, the TPC command having a value of 0 means that the PSD of the transmitted signal is lowered by −1 dB.

Considering the PUSCH transmission power of the mobile terminal in the above Equation 1, a method for efficiently determining a TPC command is required. As a result, the received SNR (or received SINR) required by the base station may be fitted even in the state in which the path loss at the current location of the mobile terminal is not known.

Further, to reduce the battery consumption of the mobile terminal, the transmission power does not exceed $P_{CMAX}$. If the transmission power exceeds $P_{CMAX}$, the PUSCH receive performance of the base station is degraded, uplink to performance is degraded, and battery consumption of the mobile terminal becomes severe.

Hereinafter, a method for controlling uplink closed-loop power in an LTE-based small cell base station system, that is, a method for controlling uplink transmission power will be described.

The wireless device (for example, small cell base station) receives a power headroom report (PHR) indicating an available transmission power amount of the mobile terminal from the mobile terminal. Further, the wireless device (for example, small cell base station) determines the target SNR (or target SINR) required (corresponding to current location of the mobile terminal or the path loss) for the current location of the mobile terminal on the basis of the received PHR. In the present specification, the exemplary embodiment of the present invention will describe the case in which the channel quality information is the SNR or the SINR, by way of example. In the present specification, the content described for the case in which the channel quality information is the SNR may be identically or similarly applied to the case in which the channel quality information is the SINR, or vice versa. However, this is only an example and therefore the exemplary embodiment of the present invention may be applied even to the case in which the channel quality information is not the SNR or the SINR.

The wireless device (for example, small cell base station) receives an uplink data channel (for example, PUSCH) from the mobile terminal and applies a filter to the received SNR (received SINR) measured based thereon to determine the smoothed received SNR (or received SINR).

The wireless device (for example, small cell base station) obtains a difference between the target SNR (or target SINR) periodically determined and the smoothed received SNR (or smoothed received SNR) and determines the TPC command using the TPC mapper on the basis of the difference.

The wireless device (for example, small cell base station) receives the PHR from the mobile terminal and determines the maximum number of PRBs that may be allocated to the mobile terminal on the basis of the PHR and the current location (or path loss) of the mobile terminal The wireless device (for example, small cell base station) allocates the number of PRBs smaller than the maximum number of PRBs to the mobile terminal at the time of scheduling of an uplink scheduler.

The wireless device (for example, small cell base station) transmits the TPC command determined by the TPC mapper to the mobile terminal.

Figure 3:
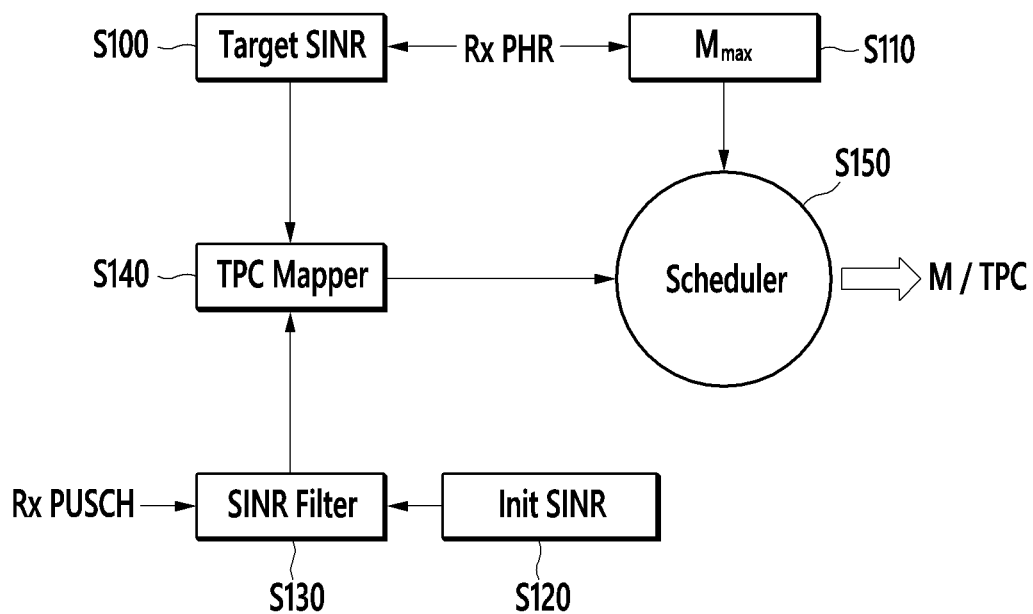
FIG. 3 is a diagram illustrating a method for controlling uplink closed-loop power according to an exemplary embodiment of the present invention.

FIG. 3 is a diagram illustrating a method for controlling uplink closed-loop power according to an exemplary embodiment of the present invention.

As illustrated in FIG. 3, for the uplink closed-loop power control, a procedure of determining the target SINR (or target SNR) (S100), a process of determining $M_{max}$ (S110), a process of determining an initial value for the SINR filter (or SNR filter) (S120), a process of using the SINR filter (or SNR filter) (S130), a process of determining the TPC command (S140), and a scheduling process (S150) are performed.

First, the process of determining the target SINR (or target SNR) (S100) will be described.

The wireless device (for example, small cell base station) determines the to target SINR (or target SNR) for the mobile terminal on the basis of the received PHR value and α value whenever the PHR is received from the mobile terminal.

The target SINR (or target SNR) is changed depending on the a value for determining how much the path loss is compensated and the path loss of the mobile terminal. Here, the path loss of the mobile terminal may correspond to the current location of the mobile terminal.

When α=1, the wireless device (for example, small cell base station) receives a signal with the constant received power independent of the path loss of the mobile terminal. That is, the base station receives a signal with the same received power independent of whether the mobile terminal is close to or far away from the base station. The power control is called a conventional power control (CPC).

In the case of α<1, the receive PSD is changed depending on the path loss of the mobile terminal. That is, for the mobile terminal that is close to the base station and thus has the small path loss, the base station receives a signal with a high PSD and for the mobile terminal that is far away from the base station and thus has a large path loss, the base station receives a signal with a low PSD. The power, control is called a fractional power control (FPC).

$P_{0\_PUSCH}$ (receive PSD required by the base station) of the conventional power control (CPC) has the same value for all the mobile terminals independent of the path loss of the mobile terminal and may be obtained from the above Equation 2. If α=1 is substituted into the above Equation 2, the following Equation is obtained.

$$P_{0\_PUSCH} = SINR_0 + P_n \text{ [dBm]}$$

In the above Equation, $P_n$ represents noise power per the PRB and is calculated like the following Equation.

$$P_n = -174 \text{ dBm/Hz} + 10 \cdot \log_{10}(180 \text{ kHz}) = -121 \text{ [dBm/PRB]}$$

Therefore, when α=1, the transmit (Tx) PSD of the mobile terminal is as the following Equation.

$$PSD_{tx} = SINR_0 + P_n + PL \text{ [dBm/PRB]}$$

The path loss is consumed before the signal reaches the base station, and therefore the receive (Rx) PSD at the base station is as the following Equation.

$$PSD_{rx} = SINR_0 + P_n = P_{0\_PUSCH} \text{ [dBm/PRB]}$$

Therefore, the target SINR (or target SNR) of the conventional power control (CPC) is as the following Equation 3.

$$\text{target SINR} = P_{0\_PUSCH} + 121 \text{ [dB]} \quad \text{Equation 3}$$

Meanwhile, in the fractional power control (FPC), the target SINR (or target SNR) is changed depending on the path loss of the mobile terminal, that is, the current location of the mobile terminal. Therefore, the transmit (Tx) PSD of the mobile terminal is given by the following Equation.

$$PSD_{tx} = P_{0\_PUSCH} + \alpha \cdot PL \text{ [dBm/PRB]}$$

The path loss is consumed before the signal reaches the base station, and therefore the receive (Rx) PSD at the base station is given by the following Equation 4.

$$PSD_{rx} = P_{0\_PUSCH} + \alpha \cdot PL - PL = P_{0\_PUSCH} + (\alpha - 1)PL \text{ [dBm/PRB]} \quad \text{Equation 4}$$

As illustrated in the above Equation 4, the path loss at the fractional power control (FPC) is an important element However, the path loss for the mobile terminal is measured by the mobile terminal and therefore the base station may not directly know the path loss. Therefore, the base station may indirectly derive the path loss of the mobile terminal using the PHIR of the mobile terminal and determine the target SIRN (or target SNR) for the mobile terminal depending on the derived path loss. This will be described in detail with reference to FIG. 4.

Figure 4:
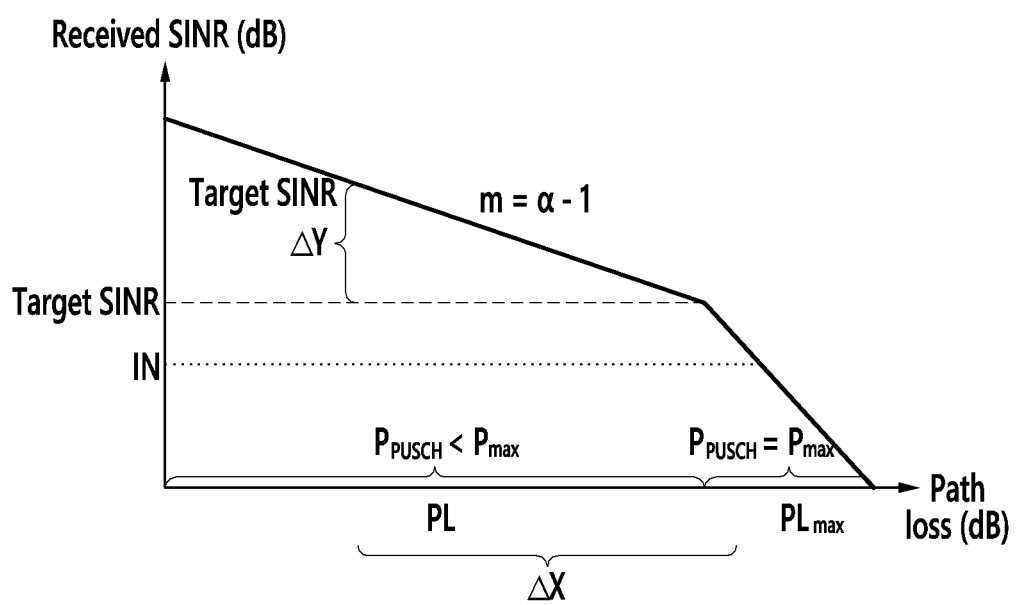
FIG. 4 is a diagram illustrating a method for determining a target SINR (or target SNR) on the basis of a path loss of the mobile terminal according to an to exemplary embodiment of the present invention.

FIG. 4 is a diagram illustrating a method for determining a target SINR (or target SNR) on the basis of a path loss of the mobile terminal according to an exemplary embodiment of the present invention. In FIG. 4, a horizontal axis represents the path loss and a vertical axis represents the received SINR. In FIG. 4, IN represents noise power.

As illustrated in FIG. 4, the target SINR (or target SNR) is obtained by slope m depending on α. m is given by the following Equation 5.

$$m = \frac{\Delta Y}{\Delta X} \quad \text{Equation 5}$$

In the above 5, ΔX and ΔY are given by the following Equation.

$$\Delta Y = \text{Target SINR}' - \text{Target SINR [dB]}$$

$$\Delta X = PL - PL_{max} \text{ [dB]}$$

In the above Equation, TargetSINR' represents a new target SINR depending on the path loss of the mobile terminal and TargetSINR represents the target SINR of the above Equation 3 for the case of α=1.

Further, PL and $PL_{max}$ may be obtained (derived) by the following Equation 6 from the above Equation 1 on the basis of PHR ($P_h$).

$$PHR(P_h) = P_{CMAX} - P_{PUSCH} \quad \text{Equation 6}$$

$$PL = \frac{1}{\alpha} \{P_{CMAX} - P_h - 10\log_{10}(M_{PUSCH}) - P_{0\_PUSCH} - f(\Delta_{TPC})\}$$

$$PL_{max} = \frac{1}{\alpha} \{P_{CMAX} - 10\log_{10}(M_{PUSCH}) - P_{0\_PUSCH} - f(\Delta_{TPC})\},$$

$$\text{if } P_h = 0$$

In the above Equation 6, $P_h$ represents the available transmission power amount (i.e., power headroom) indicated by the PHR of the mobile terminal, $P_{CMAX}$ represents the maximum transmission power of the mobile terminal, $M_{PUSCH}$ represents the number of PRBs transmitted through the PUSCH, and $PL_{max}$ represents the maxi mum path loss. Here, Ph is obtained on the basis of the difference between the maximum transmission power of the mobile terminal and the current PUSCH transmission power. In detail, $P_h$ is reported by the PHR in an indicator form like the following Table 3. $P_h$ represents the available transmission power amount corresponding to the PHR indicator. Therefore, when $P_h$=0, the available transmission power amount is 0 and the path loss is maximum, such that the $PL_{max}$ may be obtained. Hereinafter, $P_h$ may also be represented by the PHR ($P_h$).

TABLE 3

Power headroom report mapping

| Reported value | Measured quantity value (dB) |
|---|---|
| POWER_HEADROOM_0 | −23 ≤ PH < −22 |
| POWER_HEADROOM_1 | −22 ≤ PH < −21 |
| POWER_HEADROOM_2 | −21 ≤ PH < −20 |
| POWER_HEADROOM_3 | −20 ≤ PH < −19 |
| POWER_HEADROOM_4 | −19 ≤ PH < −18 |
| POWER_HEADROOM_5 | −18 ≤ PH < −17 |
| . . . | . . . |
| POWER_HEADROOM_57 | 34 ≤ PH < 35 |
| POWER_HEADROOM_58 | 35 ≤ PH < 36 |
| POWER_HEADROOM_59 | 36 ≤ PH < 37 |
| POWER_HEADROOM_60 | 37 ≤ PH < 38 |
| POWER_HEADROOM_61 | 38 ≤ PH < 39 |
| POWER_HEADROOM_62 | 39 ≤ PH < 40 |
| POWER_HEADROOM_63 | PH ≥ 40 |

In the above Table 3, the PH means $P_h$.

As a result, the new target SINR (target SINR') depending on the path loss of the mobile terminal may be obtained by the following Equation 7.

$$\text{Target SIN}R' = \quad \text{Equation 7}$$

$$\begin{cases} (1-\alpha) \cdot \dfrac{P_h}{\alpha} + \text{Target SIN}R, & PL < PL_{max}(PH > 0) \\ \text{Target SIN}R, & PL \geq PL_{max}(PH \leq 0) \end{cases}$$

In the above Equation 7, the PH means $P_h$.

The target SINR (or target SNR) for the case in which the fractional power control (FPC) is used may be determined by the above Equation 7.

Next, the process of determining $M_{max}$ (S110) will be described.

As illustrated in the above Equation 1, the PUSCH transmission power is determined depending on the path loss at the current location of the mobile terminal, the TPC command, and the number of allocated PRBs. In particular, like the small cell environment, in the environment that the path loss of the mobile terminal and the shadowing are not suddenly changed, the main factor of changing the transmission power is the number of allocated PRBs. To reduce the battery consumption of the mobile terminal under the environment, the transmission power needs to be controlled not to exceed the $P_{CMAX}$ that is the maximum transmission power of the mobile terminal.

Therefore, whenever the PHR is received, the wireless device (for example, base station) may determine the maximum number of PRBs that may be currently allocated to the mobile terminal on the basis of the number of allocated PRBs for the transmission of the PHR. Further, the wireless device (for example, base station) may determine the number of PRBs to be allocated to the mobile terminal within the range in which the number of PRBs does not exceed the maximum number of PRBs at the time of the scheduling of the scheduler.

The $M_{max}$ represents the number of PRBs that may maximally be allocated to the mobile terminal within the range in Which the number of PRBs does not exceed the $P_{cmax}$. To obtain the $K_{max}$, the current path loss state of the mobile terminal may be considered. In detail, the $M_{max}$ may be obtained by the following Equation on the basis of the PHR ($P_h$).

The following Equation may be derived from the above Equation 6.

$$P_{PUSCH} = P_{CMAX} \cdot PHR(P_h)$$

Further, the following Equation 8 may be derived from the above Equation and the above Equation 1.

$$P_{CMAX} - PHR(P_h) = 10\log_{10}(M_{PUSCH}) + P_{0\_PUSCH} + \alpha PL + f(\Delta_{TPC})$$

$$P_{CMAX} - PHR(P_h) = 10\log_{10}(M_{PUSCH}) + P_{0\_PUSCH} + \alpha PL + f(\Delta_{TPC}) \quad \text{Equation 8}$$

Further, the $P_{CMAX}$ depending on the $M_{max}$ may be obtained by the following Equation 9.

$$P_{CMAX} = 10\log_{10}(M_{max}) + P_{0\_PUSCH} + \alpha PL + f(\Delta_{TPC}) \quad \text{Equation 9}$$

Therefore, the $M_{max}$ may be obtained by the following Equation 10 on the basis of the above Equations 8 and 9.

$$M_{max} = 10^{\frac{10\log_{10}(M_{PUSCH}) + PHR(P_h)}{10}} \quad \text{Equation 10}$$

Next, the process of using, an SINR filter (or SNR filter) (S130) will be described.

When the base station receives the PUSCH, a physical (PHY) layer of the base station measures the received SINR (or received SNR) for the PUSCH and reports the measured received MR to the scheduler of the base station. Here, the measured received SINR (or received SNR) may not be considered to be an accurate value at all times due to a state of a radio channel, a measurement error of a receiver, or the like. Therefore, the base station may smooth the received SINR (or received SNR) using the SINR filter (or SNR filter) to obtain the smoothed received SINR (or smoothed received SINR).

To smooth the SINR (or SNR) of the PUSCH received from the mobile terminal, the base station may use an exponential filter that is one of moving average filters. At this point, due to hardware characteristics of the small cell, the use of the filter that is not too complex is required, and therefore the base station may use a 1-step exponential filter like the following Equation 11.

$$Y(t) = (1-\mu) \cdot Y(t-1) + \mu \cdot X(t) \quad \text{Equation 11}$$

In the above Equation 11, Y(t) represents an output value output from the SINR filter (or SNR filter) at time t, Y(t−1) represents an output value output from the SINR filter (or SNR filter) at time t−1, and X(t) represents an input value (i.e., SINR (or SNR) of the receive PUSCH) input to, the SINR filter (or SNR filter) at time t. In the above Equation 11, μ represents an SINR filter parameter (or SNR filter parameter), in which $0 \leq \mu \leq 1$. μ may generally have a value of 0.7 to 0.9 and may be determined by the experiment.

Next, the process of determining an initial value for an SINR filter (or SNR filter) (S120) will be described.

The base station may use the SINR value (or SNR value) acquired at the time of receiving an M3 message as the initial value for using the SINR filter (or SNR filter). That is, the received SINR value (or received SNR value) for the M3 message may be used as the initial value for the SINR filter (or SNR filter). Here, the M3 message is a message that the base station first receives in a random access procedure of accessing a mobile terminal to a base station. The power control for the M3 message is performed based on the received SINR value (or SNR value) of a physical random access channel (PRACH) preamble.

$\delta M3$ for the power control for the M3 message may be defined like the following Equation 12.

$$\delta_{M3}: \text{Target SINR} - (\text{Received PRACH SINR} + \Delta_{PREAMBLE\_Msg3}) \quad \text{Equation 12}$$

In the above Equation 12, the received PRACH SINR represents the SINK (or SNR) of the received PRACH preamble. Further, $\Delta_{PREAMBLE\_Msg3}$ represents a power offset required for M3 reception to the SINR (or SNR) of the received PRACH preamble and is defined in system information.

The TPC command for the M3 (or M3 message) is given by the following Table 4.

TABLE 4

| TPC command | Value (in dB) |
| --- | --- |
| 0 | −6 |
| 1 | −4 |
| 2 | −2 |
| 3 | 0 |
| 4 | 2 |
| 5 | 4 |
| 6 | 6 |
| 7 | 8 |

Next, the process of determining a TPC command (S140) will be described.

The TPC mapper serves to determine the TPC command value on the basis of the difference between the target SINR (or target SNR) and the filtered (smoothed) received SINR (or received SNR).

If the TPC mapper determines the TPC command value whenever there is the difference between the target SINR (or target SNR) and the filtered (smoothed) received SINR (or received SNR), the TPC mapper may reflect even the case in which the channel is temporarily fluctuated, such that an error may occur in the power control To prevent the error of the power control, the TPC mapper may determine the TPC command based on the received SINR (or received SNR) determined by the SINR filter (or SNR filter) for a predetermined period (TPC command update period).

The TPC mapper of the base station may determine the TPC command using the following Equation based on the above Table 1 and Table 2.

$$\delta_{PUSCH}: \text{Target SINR} - \text{Received SINR}$$

In the above Equation, $\delta_{PUSCH}$ represents the difference between the target SINR (or target SNR) and the received SINR (or SNR) and ReceivedSINR represents the filtered (smoothed) received SINR (or SNR). In detail, in the above Equation, the ReceivedSINR may represent the received SINR (or SNR) determined by be filtered (smoothed) for the TPC command update period.

The TPC command update period may be changed depending on the installation environment of the system or the radio channel, environment.

The base station may determine (calculate) the $\delta_{PUSCH}$ after the TPC command update period elapses to transmit the TPC command based on the $\delta_{PUSCH}$ to the mobile terminal. Further, the base station may set to be $\delta_{PUSCH}=0$ from the TPC command update period to the next TPC command update period (time when the next TPC command update period ends) to transmit the TPC command based on the $\delta_{PUSCH}$ to the mobile terminal. Further, the base station may again determine (calculate) the $\delta_{PUSCH}$ after the corresponding TPC command update period elapses to transmit the TPC command based on the $\delta_{PUSCH}$ to the mobile terminal.

Next, the scheduling process by the scheduler (S150) will be described.

The base station may allocate the number of PRBs smaller than the maximum number of PRBs to the mobile terminal and transmit the TPC command to the mobile terminal. In FIG. 3, M of 'M/TPC' represents the number of PRBs allocated to the mobile terminal and TPC of 'M/TPC' represents the TPC command transmitted to the mobile terminal.

Figure 5:
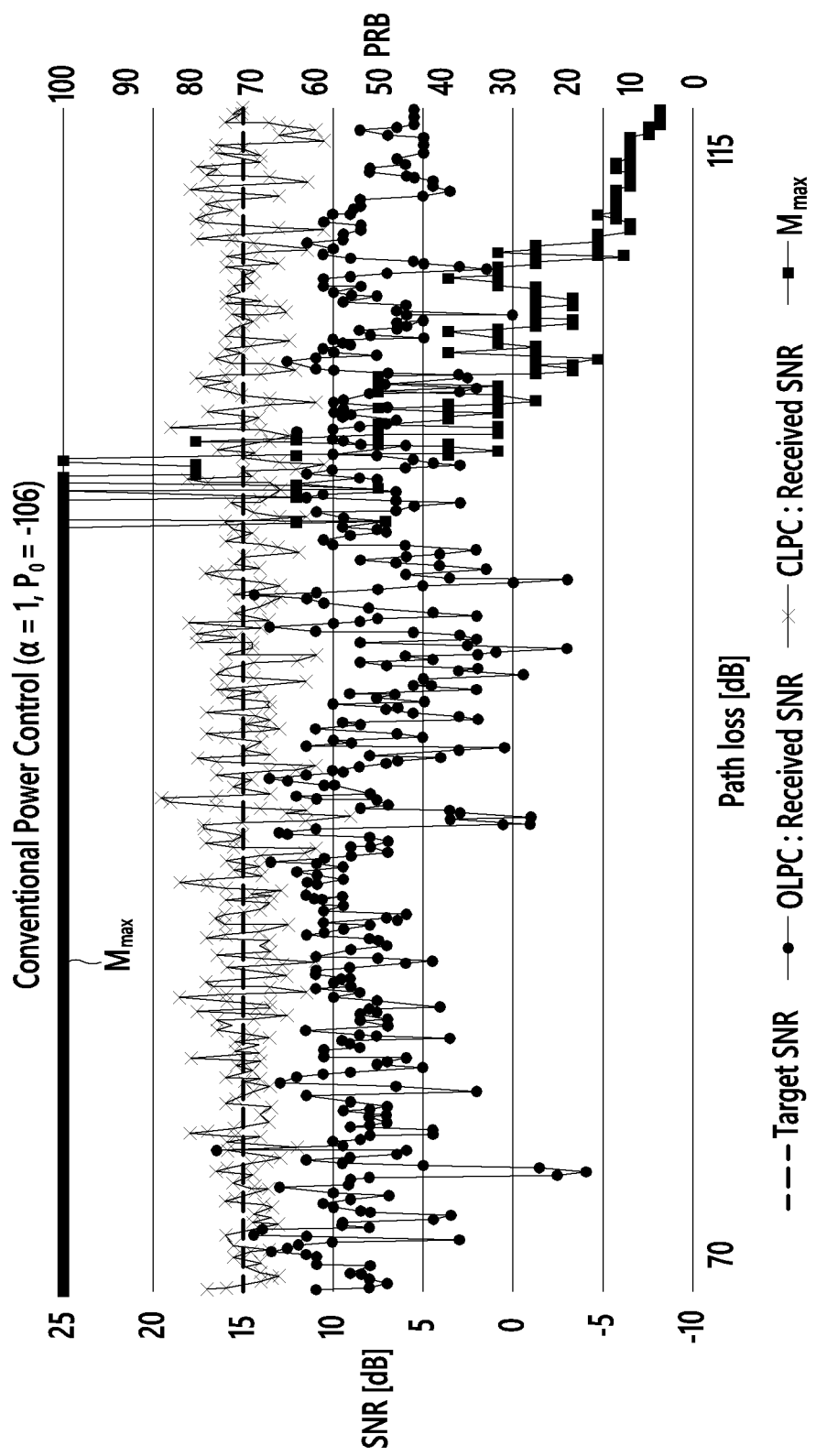
FIG. 5 is a diagram illustrating measured SNR when a conventional power control is used.
Figure 6:
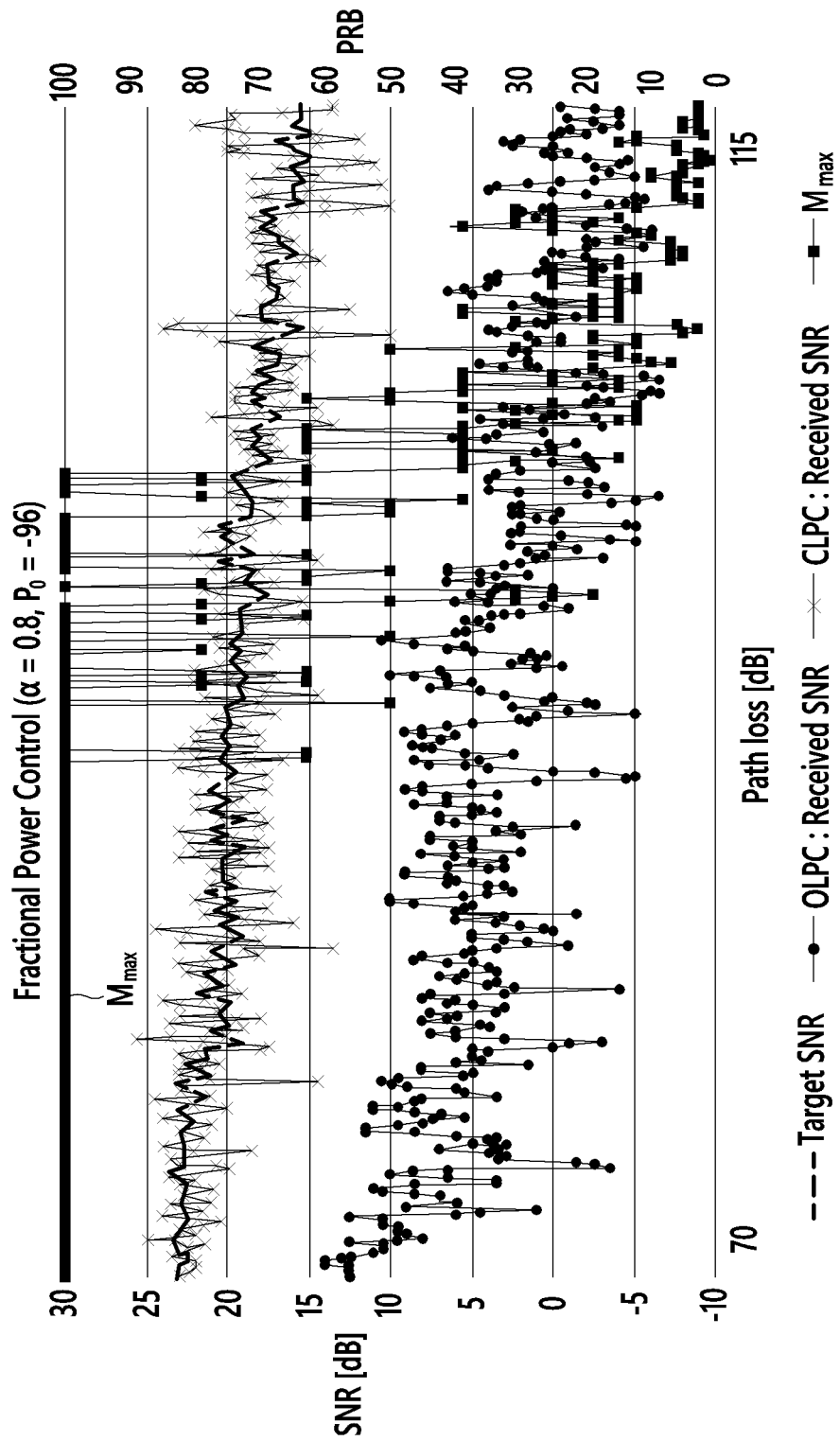
FIG. 6 is a diagram illustrating measured SNR when a fractional power control is used.

FIG. 5 is a diagram illustrating measured SNR when a conventional power control is used. FIG. 6 is a diagram illustrating measured SNR when a fractional power control is used. In FIGS. 5 and 6, OLPC represents the open-loop power control and CLPC represents the closed-loop power control. In FIGS. 5 and 6, $P_0$ represents $P_{0\_PUSCH}$.

In detail, FIGS. 5 and 6 illustrate measurement results of $M_{max}$ the SNR of the PUSCH received by the small cell base station based on the method for controlling power according to the exemplary embodiment of the present invention and the $M_{max}$ as the mobile terminal moves from a cell center to a cell edge.

As illustrated in the measurement results of the conventional power control (CPC) and the fractional power control (FPC), in the case of the method for controlling closed-loop power than the case of the method for controlling open-loop power, the transmission power of the mobile terminal is controlled without the received SNR greatly deviating from the target SNR.

Further, as illustrated in FIGS. 5 and 6, as the mobile terminal moves to a cell edge (toward the right of the horizontal axis), the maximum number $M_{max}$ of PRBs that can be allocated to the mobile terminal is limited. As a result, the small cell base station may adaptively perform the power control of the mobile terminal while reducing the battery consumption of the mobile terminal.

Figure 7:
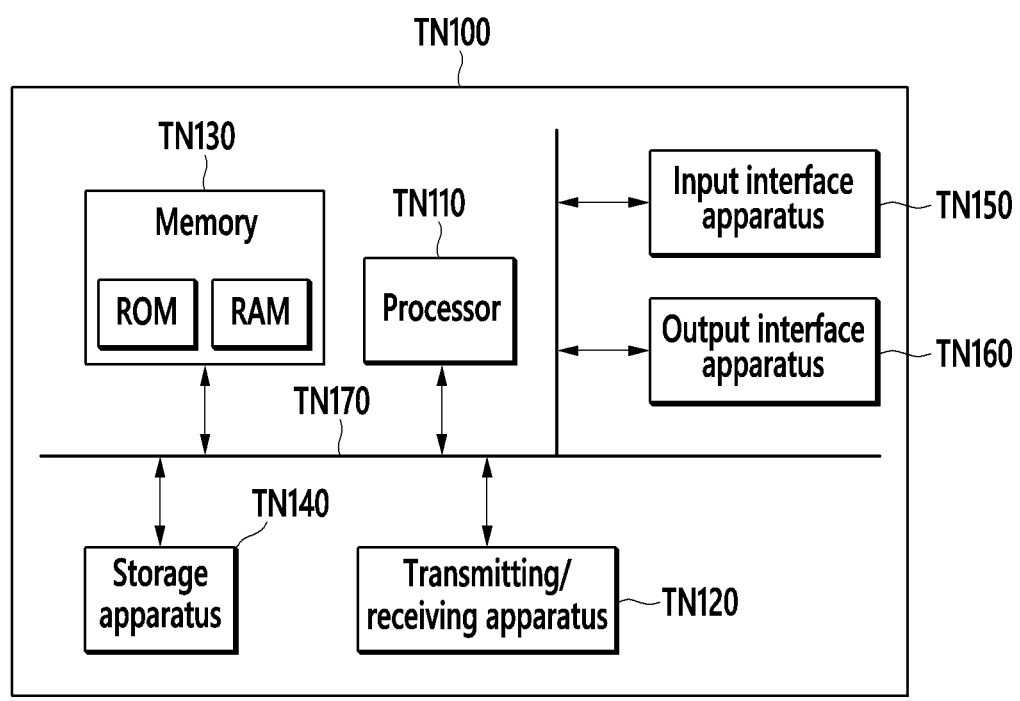
FIG. 7 is a diagram illustrating a wireless device (or communication node) according to an exemplary embodiment of the present invention.

FIG. 7 is a diagram illustrating a wireless device (or communication node) according to an exemplary embodiment of the present invention. A wireless device TN100 may be the base station, the terminal, or the like described in the present specification and may be a transmitter or a receiver.

In the exemplary embodiment of FIG. 7, the wireless device TN100 may include at least one processor TN110, a transmitting/receiving apparatus TN120 connected to a network to perform communication, and a memory TN130. Further, the wireless device TN100 may further include a storage apparatus TN140, an input interface apparatus TN150, an output interface apparatus TN160, or the like. Components included in the wireless device TN100 may be connected to each other by a bus TN170 to communication with each other.

The processor TN110 may run a program command that is stored in at least one of the memory TN130 and the storage apparatus TN140. The processor TN110 may mean a central processing unit (CPU), a graphics processing unit (GPU), or an exclusive process that performs method according to exemplary embodiments of the present invention. The processor TN110 may be configured to implement the procedures, the functions, and the methods described with reference to the exemplary embodiment of the present invention. The processor TN110 may control each of the components of the wireless device TN100.

The memory TN130 and the storage apparatus TN140 may each store various information associated with the operation of the processor TN110. The memory TN130 and the storage apparatus TN140 may each be configured of at least one of a volatile storage medium and a non-volatile storage medium. For example, the memory TN130 may be configured of at least one of a read only memory (ROM) and a random access memory (RAM).

The transmitting/receiving apparatus TN120 may transmit or receive a wired signal or a wireless signal. Further, the wireless device TN100 may have a single antenna or a multiple antenna.

According to an exemplary embodiment of the present invention, it is possible to control the uplink transmission power in the LTE-based small cell base station system.

Further, according to an exemplary embodiment of the present invention, to it is possible to determine the receive target SNR (or receive target SINR) that the base station requires, on the basis of the power headroom report (PHR) reported by the mobile terminal.

Further, according to an exemplary embodiment of the present invention, it is possible to determine the received SNR (or received SINR) by smoothing the SNR (or SINR) of the PUSCH received from the mobile terminal.

Further, according to an exemplary embodiment of the present invention, it is possible to determine the transmit power control (TPC) command on the basis of the difference between the target SNR (or target SINR) and the smoothed received SNR (or smoothed received SINR) by the TCP mapper periodically performed.

Further, according to an exemplary embodiment of the present invention, it is possible to determine the physical resource block (PRB) maximally allocated by estimating the remaining power of the current mobile terminal on the basis of the PHR reported by the mobile terminal.

Further, according to an exemplary embodiment of the present invention, it is possible to minimize the battery consumption of the mobile terminal while keeping the received power required by the base station by allocating less PRB than the maximum PRB using the uplink scheduler.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily to implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for controlling, by a base station, uplink transmission power of a mobile terminal, comprising:
receiving an available transmission power amount of the mobile terminal from the mobile terminal;
determining a target channel quality value corresponding to a current location of the mobile terminal, on the basis of the available transmission power amount;
determining a received channel quality value using an uplink data channel received from the mobile terminal; and
determining a transmit power control (TPC) using a difference between the target channel quality value and the received channel quality value,
wherein the receiving of the available transmission power amount includes receiving a power headroom report (PHR) indicating the available transmission power amount, and
wherein the determining of the target channel quality value on the basis of the available transmission power amount includes:
deriving a path loss using the PHR when a first value indicating how much the path loss corresponding to the current location of the mobile terminal is compensated is smaller than 1; and
determining the target channel quality value depending on the derived path loss.

2. The method of claim 1, wherein the determining of the target channel quality value depending on the derived path loss includes determining the target channel quality value depending on the following Equation 1:

$$\text{target}' = (1-\alpha) \cdot \frac{P_h}{\alpha} + \text{target, if } P_h > 0 \qquad \text{Equation 1}$$

(target': the target channel quality value, α: the first value, $P_h$: the available transmission power amount indicated by the PHR, target: the target channel quality value when α=1).

3. The method of claim 1, wherein the determining of the target channel quality value on the basis of the available transmission power amount includes determining the target channel quality value depending on the following Equation 1 when a first value indicating how much a path loss corresponding to the current location of the mobile terminal is compensated is equal to 1:

$$\text{target} = P_{0\_CH} + 121 \, [dB] \qquad \text{Equation 1}$$

(target: the target channel quality value, $P_{0\_CH}$: received power spectral density (PSD) required by the base station).

4. The method of claim 1, wherein the determining of the received channel quality value includes smoothing a first channel quality value measured for the uplink data channel.

5. The method of claim 4, wherein the smoothing includes smoothing the first channel quality value on the basis of an exponential filter that is a moving average filter.

6. The method of claim 4, wherein the smoothing includes smoothing the first channel quality value on the basis of a 1-step exponential filter defined by the following Equation 1:

$$Y(t) = (1-\mu) \cdot Y(t-1) + \mu \cdot X(t) \qquad \text{Equation 1}$$

(Y(t): output value output from the 1-step exponential filter at time t, Y(t−1): output value output from the 1-step exponential filter at time t−1, X(t): the first channel quality value input to the 1-step exponential filter at time t, 0≤μ≤1).

7. The method of claim 5, wherein the smoothing of the first channel quality value on the basis of the exponential filter includes using a second channel quality value for an M3 message first received for a random access as an initial value for the exponential filter.

8. The method of claim 1, wherein the determining of the TPC includes:
calculating, at a first time, a first difference between the target channel quality value and the received channel quality value determined during an update period for updating the TPC; and
determining a TPC command on the basis of the first difference.

9. The method of claim 8, wherein the update period is changed depending on radio channel environment.

10. The method of claim 8, wherein the determining of the TPC command on the basis of the first difference includes setting a difference between the target channel quality value and the received channel quality value to be 0 from the first time to time when a next update period ends.

11. The method of claim 1, further comprising:
determining the maximum number of resource blocks allocated to the mobile terminal on the basis of the available transmission power amount and the current location of the mobile terminal; and
allocating the number of resource blocks smaller than the maximum number to the mobile terminal.

12. The method of claim 11,
wherein the receiving of the available transmission power amount includes receiving a power headroom report (PHR) indicating the available transmission power amount, and
wherein the determining of the maximum number includes calculating the maximum number depending on the following Equation 1:

$$M_{max} = 10^{\frac{10\log_{10}(M_{PUSCH}) + PHR(P_h)}{10}} \qquad \text{Equation 1}$$

($M_{max}$: the maximum number, $M_{PUSCH}$: the number of resource blocks transmitted through the uplink data channel, $PHR(P_h)$: the available transmission power amount indicated by the PHR).

13. The method of claim 1, wherein:
the base station is a small cell base station,
the target channel quality value and the received channel quality value are one of a signal-to-interference plus noise ratio (SINR) and a signal to noise ratio (SNR), and
the uplink data channel is a physical uplink shared channel (PUSCH).

14. A method for controlling, by a mobile terminal, uplink transmission power, comprising:
transmitting an available transmission power amount of the mobile terminal to a base station;
transmitting an uplink data channel to the base station;
receiving, from the base station, a transmit power control (TPC) determined by a difference between a target channel quality value on the basis of a first value indicating how much a path loss of the mobile terminal is compensated and the available transmission power amount and a received channel quality value for the uplink data channel; and receiving an allocation of the number of resource blocks smaller than the maximum number of resource blocks allocated to the mobile terminal from the base station, wherein the maximum number is determined on the basis of the available transmission power amount and the path loss of the mobile terminal.

15. The method of claim 14, wherein the target channel quality value is determined depending on the following Equation 1:

$$\text{target}' = (1-\alpha) \cdot \frac{P_h}{\alpha} + \text{target, if } P_h > 0 \quad \text{Equation 1}$$

(target': the target channel quality value, $\alpha$: the first value, $P_h$: the available transmission power amount of the mobile terminal, target: the target channel quality value when a $\alpha$=1).

16. A base station comprising:

a memory; and a processor connected to the memory and determining a target channel quality value corresponding to a path loss of a mobile terminal on the basis of a power headroom report (PHR) of the mobile terminal, wherein the processor determines a transmit power control (TPC) command for the mobile terminal on the basis of a difference between a received channel quality value determined by a physical uplink shared channel (PUSCH) of the mobile terminal and the target channel quality value, and wherein the processor determines the maximum number of resource blocks allocated to the mobile terminal on the basis of the PHR and the path loss of the mobile terminal and allocates the number of resource blocks smaller than the maximum number to the mobile terminal.

17. The base station of claim 16, wherein the processor determines the maximum number depending on the following Equation 1:

$$M_{max} = 10^{\frac{10\log_{10}(M_{PUSCH}) + PHR(P_h)}{10}} \quad \text{Equation 1}$$

($M_{max}$: the maximum number, $M_{PUSCH}$: the number of resource blocks transmitted through the PUSCH, PHR($P_h$): the available transmission power amount indicated by the PHR).

* * * * *